United States Patent
You

(10) Patent No.: US 11,089,798 B2
(45) Date of Patent: Aug. 17, 2021

(54) ICE CREAM MANUFACTURING APPARATUS, ICE CREAM MANUFACTURING METHOD, AND ICE CREAM DRAWING METHOD

(71) Applicant: ICETRO CO., LTD., Incheon (KR)

(72) Inventor: Se Hoon You, Seoul (KR)

( * ) Notice: Subject to any disclaimer, the term of this patent is extended or adjusted under 35 U.S.C. 154(b) by 736 days.

(21) Appl. No.: 15/422,473

(22) Filed: Feb. 2, 2017

(65) Prior Publication Data

US 2017/0142999 A1    May 25, 2017

Related U.S. Application Data

(63) Continuation of application No. PCT/KR2015/008581, filed on Aug. 18, 2015.

(30) Foreign Application Priority Data

Aug. 19, 2014  (KR) .......................... 10-2014-0107942
Aug. 17, 2015  (KR) .......................... 10-2015-0115307

(51) Int. Cl.
    *A23G 9/22*         (2006.01)
    *A23G 9/12*         (2006.01)
    *A23G 9/20*         (2006.01)
    *A23G 9/28*         (2006.01)

(52) U.S. Cl.
    CPC ............... *A23G 9/228* (2013.01); *A23G 9/12* (2013.01); *A23G 9/20* (2013.01); *A23G 9/22* (2013.01); *A23G 9/281* (2013.01); *A23G 9/224* (2013.01)

(58) Field of Classification Search
None
See application file for complete search history.

(56) References Cited

U.S. PATENT DOCUMENTS 5,615,559 A * 4/1997 Kress ................. A23G 9/16
                                                      62/136
6,490,872 B1 * 12/2002 Beck ................. A23G 9/045
                                                      62/303

FOREIGN PATENT DOCUMENTS

JP      07-274840 A     10/1995
JP      2002-175925 A    6/2002
JP      2002-176925 A    6/2002
(Continued)

OTHER PUBLICATIONS

Translation of WO 2013129756A1.*
(Continued)

*Primary Examiner* — Elizabeth J Martin
(74) *Attorney, Agent, or Firm* — Jongkook Park

(57) ABSTRACT

An ice cream manufacturing apparatus, an ice cream manufacturing method, and an ice cream drawing method. An apparatus for manufacturing ice cream includes: a dasher positioned in a cylinder and agitating a liquefied original ice cream liquid and air input into the sealed cylinder; a dasher motor rotating the dasher; a motor RPM control means controlling a frequency of the dasher motor; a dasher motor load measuring means measuring a load of the dasher motor; and a controller determining a rotational speed change time of the dasher motor based on the load measured by the dasher motor load measuring means and controlling the motor RPM control means so as to change the frequency of the dasher motor to a predetermined frequency when the change of the rotational speed of the dasher motor is determined.

5 Claims, 11 Drawing Sheets

(56) References Cited

FOREIGN PATENT DOCUMENTS

| | | |
|---|---|---|
| JP | 2007-054004 A | 3/2007 |
| JP | 2008-067643 A | 3/2008 |
| JP | 2009-050246 A | 3/2009 |
| KR | 10-2007-0050933 A | 5/2007 |
| KR | 10-1115320 B1 | 3/2012 |
| KR | WO 2013129756 A1 * | 11/2012 |
| KR | 10-2013-0100671 A | 9/2013 |

OTHER PUBLICATIONS

Korean Office Action for corresponding Korean Patent Application No. 10-2015-0115307 dated Dec. 20, 2016.
Korean Office Action for corresponding Korean Patent Application No. 10-2014-0107942 dated Jan. 8, 2016.
International Search Report dated Nov. 23, 2015 for PCT/KR2015/008581.

* cited by examiner

ICE CREAM MANUFACTURING APPARATUS, ICE CREAM MANUFACTURING METHOD, AND ICE CREAM DRAWING METHOD

CROSS-REFERENCE TO RELATED APPLICATIONS

The present application is a continuation of International Patent Application No. PCT/KR2015/008581 filed on Aug. 18, 2015, which is based upon and claims the benefit of priority to Korean Patent Application No. 10-2014-0107942 filed on Aug. 19, 2014, and Korean Patent Application No. 10-2015-0115307 filed on Aug. 17, 2015. The disclosures of the above-listed applications are hereby incorporated by reference herein in their entirety.

TECHNICAL FIELD

The present invention relates to an ice cream manufacturing apparatus, an ice cream manufacturing method, and an ice cream drawing method, and to a technology that generates ice cream having optimal ice quality and a technology that uniformalizes a drawing amount when ice cream is drawn.

BACKGROUND ART

In general, soft ice cream has softer ice quality than frozen ice cream by mixing a liquefied ice cream original liquid with air and changing the original liquid to slightly frozen ice cream by using a cooling means. The ice cream generated by such a method is maintained and kept in an ice cream manufacturing apparatus until the ice cream is drawn. In addition, when the ice cream is drawn, a new ice cream original liquid ix mixed with the pregenerated ice cream to regenerate the ice cream.

The ice quality of the soft ice cream is primarily determined by states including an evaporation temperature of an evaporator in a cylinder, a rotational speed of a dasher, a temperature at a control time, and the temperature of the ice cream original liquid and a mixture amount (over-run) of the air.

The ice cream is generated through an initial step of generating the ice cream from the liquefied ice cream original liquid and a post-drawing step in which when the ice cream is generated and thereafter, the ice cream is drawn, the new original liquid is mixed with the pregenerated ice cream. The ice cream generated by such a method is maintained and kept in the ice cream manufacturing apparatus until the ice cream is drawn.

In the initial step of generating the ice cream from the liquefied ice cream original liquid and the post-drawing step of regenerating the ice ream after drawing the ice cream, rapidly rotating a dasher motor is required for securing the ice quality. In addition, maintaining and keeping the ice cream is divided into a keeping step of keeping the generated ice cream by stopping the dasher motor and a maintaining step of regenerating ice cream which is partially melt while keeping to the ice cream again and in the maintaining step, the dasher motor is rotated again.

However, when the rotational speed of the dasher motor is not appropriate adjusted for each step, the over-run, the strength, a particle size, and viscosity of the ice cream vary, and as a result, a taste, the ice quality, and a drawing amount per time of the ice cream are continuously changed. Further, the drawing amount of the ice cream varies due to the viscosity of the ice cream, and different melting degrees of the ice cream inside and outside the cylinder for each step.

DISCLOSURE

Technical Problem

An object of the present invention is to provide an apparatus and a method for manufacturing ice cream which can maintain ice quality of the ice cream. Another object of the present invention is to provide an apparatus and a method for manufacturing ice cream which uniformalize a drawing amount of the ice cream.

Technical Solution

In order to solve the technical problem, an apparatus for manufacturing ice cream according to an embodiment of the present invention includes: a dasher positioned in a cylinder and agitating a liquefied original ice cream liquid and air input into the sealed cylinder; a dasher motor rotating the dasher; a motor RPM control means controlling a frequency of the dasher motor; a dasher motor load measuring means measuring a load of the dasher motor; and a controller determining a rotational speed change time of the dasher motor based on the load measured by the dasher motor load measuring means and controlling the motor RPM control means so as to change the frequency of the dasher motor to a predetermined frequency when the change of the rotational speed of the dasher motor is determined.

Regarding some embodiment of the apparatus for manufacturing ice cream, the dasher motor load measuring means measures current of the dasher motor.

Regarding some embodiment of the apparatus for manufacturing ice cream, while the dasher motor is driven at a first frequency, when the current measured by the dasher motor load measuring means is changed, the current measured by the dasher motor load measuring means reaches current input in the controller in advance, or a time for which the dasher motor is driven at the first frequency reaches an elapsed time input in the controller in advance, the controller controls the motor RPM control means so as to change the frequency of the dasher motor to a second frequency different from the first frequency.

Regarding some embodiment of the apparatus for manufacturing ice cream, the dasher motor load measuring means measures an RPM of the dasher motor.

Regarding some embodiment of the apparatus for manufacturing ice cream, while the dasher motor is driven at the first frequency, when the RPM measured by the dasher motor load measuring means is changed, the RPM measured by the dasher motor load measuring means reaches an RPM input in the controller in advance, or the time for which the dasher motor is driven at the first frequency reaches the elapsed time input in the controller in advance, the controller controls the motor RPM control means so as to change the frequency of the dasher motor to the second frequency different from the first frequency.

Regarding some embodiment of the apparatus for manufacturing ice cream, the ice cream is generated by steps including a first generation step in which a liquid original ice cream liquid is generated to solid ice cream; a maintenance step in which the solidified ice cream is mixed with some melted ice cream in the cylinder to regenerate the ice cream; a draw step of drawing the manufactured ice cream to the outside; and an after draw step in which ice cream which remains after the draw, a newly input original ice cream liquid, and the air are mixed with each other to regenerate the ice cream, and the controller controls the motor RPM control means so that a rotational speed of the dasher motor in the maintenance step is not higher than the rotational speeds in the first generation step, the draw step, and the after draw step.

Regarding some embodiment of the apparatus for manufacturing ice cream, at least one characteristic is provided between (a) a characteristic in which the first generation step includes an initial generation period in which the original ice cream liquid and the air are agitated, and a latter generation period in which the original ice cream liquid is solidified, while the dasher motor is driven during the initial generation period, when the load measured by the dasher motor load measuring means is changed, the load measured by the dasher motor load measuring means reaches a load input in the controller in advance, or a time for which the dasher motor is driven during the initial generation period reaches an elapsed time input in the controller in advance, the controller determines the time as a time of the latter generation period and controls the motor RPM control means so that the rotational speed of the dasher motor is lower than the rotational speed during the initial generation period, and (b) a characteristic in which the after draw step includes an initial after draw step in which the ice cream which remains after the draw, the newly input original ice cream liquid, and the air are mixed with each other, and a latter after draw period in which the remaining ice cream and the newly input original ice cream liquid are solidified, while the dasher motor is driven during the after draw period, when the load measured by the dasher motor load measuring means is changed, the load measured by the dasher motor load measuring means reaches a load input in the controller in advance, or the time for which the dasher motor is driven during the initial generation period reaches the elapsed time input in the controller in advance, the controller determines the time as a time of the after draw period and controls the motor RPM control means so that the rotational speed of the dasher motor is lower than the rotational speed of the initial after draw period.

Regarding some embodiment of the apparatus for manufacturing ice cream, the controller controls the motor RPM control means so that the rotational speeds of the latter generation period and the latter after draw period are similar to the rotational speed in the maintenance step.

Regarding some embodiment of the apparatus for manufacturing ice cream, the ice cream is manufactured by using the apparatus for manufacturing ice cream.

In order to solve the technical problem, a method for manufacturing ice cream by using an apparatus for manufacturing ice cream, which includes a dasher positioned in a cylinder and agitating a liquefied original ice cream liquid and air, and a dasher motor rotating the dasher, the method comprising: a first generation step in which a liquid original ice cream liquid is generated to solid ice cream; a maintenance step in which the solidified ice cream is mixed with some melted ice cream in the cylinder to regenerate the ice cream; a draw step of drawing the manufactured ice cream to the outside; and an after draw step in which ice cream which remains after the draw, a newly input original ice cream liquid, and the air are mixed with each other to regenerate the ice cream, a rotational speed of the dasher motor in the maintenance step is not higher than the rotational speeds in the first generation step, the draw step, and the after draw step.

Regarding some embodiment of the method for manufacturing ice cream, at least one characteristic is provided between (a) a characteristic in which the first generation step includes an initial generation period in which the original ice cream liquid and the air are agitated, and a latter generation period in which the original ice cream liquid is solidified, the rotational speed of the dasher motor during the latter generation period is lower than the rotational speed of the dasher motor during the initial generation period, and (b) a characteristic in which the after draw step includes an initial after draw step in which the ice cream which remains after the draw, the newly input original ice cream liquid, and the air are mixed with each other, and a latter after draw period in which the remaining ice cream and the newly input original ice cream liquid are solidified, and the rotational speed of the dasher motor during the latter after draw period is lower than the rotational speed of the dasher motor during the initial after draw period.

Regarding some embodiment of the method for manufacturing ice cream, the rotational speeds during the latter generation period and the latter after draw period are similar to the rotational speed of the dasher motor in the maintenance step.

Regarding some embodiment of the method for manufacturing ice cream, the rotational speed of the dasher motor is changed based on at least one of a load measured in the dasher motor, a variation of the load measured in the dasher motor, and an elapsed time.

Regarding some embodiment of the method for manufacturing ice cream, the load measured in the dasher motor is current or an RPM measured in the dasher motor.

In order to solve the technical problem, a method for manufacturing ice cream by using an apparatus for manufacturing ice cream, which includes a dasher positioned in a cylinder and agitating a liquefied original ice cream liquid and air, and a dasher motor rotating the dasher, the method comprising: agitating the liquid original ice cream liquid and the air input into the cylinder; determining a change time of a rotational speed of the dasher motor based on a load measured in the dasher motor or a variation of the load measured in the dasher motor; and rotating the dasher motor at a predetermined frequency when a change of the rotational speed of the dasher motor is determined.

Regarding some embodiment of the method for manufacturing ice cream, the load measured in the dasher motor is current or an RPM measured in the dasher motor.

In order to solve the technical problem, an apparatus for manufacturing ice cream includes: a dasher positioned in a cylinder and agitating a liquefied original ice cream liquid and air input into the sealed cylinder; a dasher motor rotating the dasher; a dasher motor load measuring means measuring a load of the dasher motor; and a controller controlling a draw time of the ice cream based on the load of the dasher motor, which is measured by the dasher motor load measuring means.

Regarding some embodiment of the apparatus for manufacturing ice cream, the dasher motor load measuring means measures current of the dasher motor.

Regarding some embodiment of the apparatus for manufacturing ice cream, the controller performs a control to decrease the draw time of the ice cream when the measured current of the dasher motor is higher than predetermined reference current, and increase the draw time of the ice cream when the measured current of the dasher motor is lower than the predetermined reference current.

Regarding some embodiment of the apparatus for manufacturing ice cream, the dasher motor load measuring means measures an RPM of the dasher motor.

Regarding some embodiment of the apparatus for manufacturing ice cream, the controller performs a control to increase the draw time of the ice cream when the measured RPM of the dasher motor is higher than a predetermined reference RPM, and decrease the draw time of the ice cream when the measured RPM of the dasher motor is lower than the predetermined reference RPM.

Regarding some embodiment of the apparatus for manufacturing ice cream, the ice cream is generated and maintained by steps including a first generation step in which a liquid original ice cream liquid is generated to solid ice cream; a keeping step of keeping the solidified ice cream; a maintenance step in which the solidified ice cream is mixed with some melted ice cream in the cylinder to regenerate the ice cream; and an after draw step in which ice cream which remains after the ice cream is drawn, a newly input original ice cream liquid, and the air are mixed with each other to regenerate the ice cream, the generated ice cream is drawn to the outside in at least one step of the keeping step, the maintenance step, and the after draw step, the apparatus for manufacturing the ice cream further includes an ice cream keeping time measuring means measuring an elapsed time of the keeping step, and the controller controls the draw time of the ice cream to decrease when the keeping time of the ice cream, which is measured by the ice cream keeping time measuring means reaches a predetermined reference keeping time.

In order to solve the technical problem, a method for drawing ice cream manufactured by using an apparatus for manufacturing ice cream, which includes a dasher positioned in a cylinder and agitating a liquefied original ice cream liquid and air, and a dasher motor rotating the dasher, the ice cream is generated and maintained by steps including a first generation step in which a liquid original ice cream liquid is generated to solid ice cream; a keeping step of keeping the solidified ice cream; a maintenance step in which the solidified ice cream is mixed with some melted ice cream in the cylinder to regenerate the ice cream; and an after draw step in which ice cream which remains after the ice cream is drawn, a newly input original ice cream liquid, and the air are mixed with each other to regenerate the ice cream, the generated ice cream is drawn to the outside in at least one step of the keeping step, the maintenance step, and the after draw step, and when current of the dasher motor is higher than predetermined reference current, a draw time of the generated ice cream decreases and when the current of the dasher motor is lower than the predetermined reference current, the draw time of the generated ice cream increases.

In order to solve the technical problem, a method for drawing ice cream manufactured by using an apparatus for manufacturing ice cream, which includes a dasher positioned in a cylinder and agitating a liquefied original ice cream liquid and air, and a dasher motor rotating the dasher, the ice cream is generated and maintained by steps including a first generation step in which a liquid original ice cream liquid is generated to solid ice cream; a keeping step of keeping the solidified ice cream; a maintenance step in which the solidified ice cream is mixed with some melted ice cream in the cylinder to regenerate the ice cream; and an after draw step in which ice cream which remains after the ice cream is drawn, a newly input original ice cream liquid, and the air are mixed with each other to regenerate the ice cream, the generated ice cream is drawn to the outside in at least one step of the keeping step, the maintenance step, and the after draw step, and when an RPM of the dasher motor is higher than a predetermined reference RPM, a draw time of the generated ice cream increases and when the RPM of the dasher motor is lower than the predetermined reference RPM, the draw time of the generated ice cream decreases.

Regarding some embodiment of the method for drawing ice cream, in the case where the generated ice cream is drawn to the outside in the keeping step, the draw time of the generated ice cream decreases when an elapsed time in the keeping step reaches a predetermined reference elapsed time.

In order to solve the technical problem, a method for manufacturing ice cream includes: a dasher positioned in a cylinder and agitating a liquefied original ice cream liquid and air input into the sealed cylinder; a dasher motor rotating the dasher; and a controller controlling a draw time of the ice cream, the ice cream is generated and maintained by steps including a first generation step in which a liquid original ice cream liquid is generated to solid ice cream; a keeping step of keeping the solidified ice cream; a maintenance step in which the solidified ice cream is mixed with some melted ice cream in the cylinder to regenerate the ice cream; and an after draw step in which ice cream which remains after the ice cream is drawn, a newly input original ice cream liquid, and the air are mixed with each other to regenerate the ice cream, the generated ice cream is drawn to the outside in at least one step of the keeping step, the maintenance step, and the after draw step, the apparatus for manufacturing the ice cream further includes an ice cream keeping time measuring means measuring an elapsed time of the keeping step, and the controller controls the draw time of the ice cream to decrease when the keeping time of the ice cream, which is measured by the ice cream keeping time measuring means reaches a predetermined reference keeping time.

In order to solve the technical problem, a method for drawing ice cream manufactured by using an apparatus for manufacturing ice cream, which includes a dasher positioned in a cylinder and agitating a liquefied original ice cream liquid and air, and a dasher motor rotating the dasher, the ice cream is generated and maintained by steps including a first generation step in which a liquid original ice cream liquid is generated to solid ice cream; a keeping step of keeping the solidified ice cream; a maintenance step in which the solidified ice cream is mixed with some melted ice cream in the cylinder to regenerate the ice cream; and an after draw step in which ice cream which remains after the ice cream is drawn, a newly input original ice cream liquid, and the air are mixed with each other to regenerate the ice cream, the generated ice cream is drawn to the outside in at least one step of the keeping step, the maintenance step, and the after draw step, and when the generated ice cream is drawn to the outside in the keeping step, the draw time of the generated ice cream decreases when an elapsed time in the keeping step reaches a predetermined reference elapsed time.

Advantageous Effects

In the related art, since a rotational speed of a dasher is uniformly maintained from an initial step up to a completion step of ice cream, ice quality of the ice cream is significantly changed, but according to an embodiment of the present invention, friction (an inter-particle contact) is minimized and a particle size of the ice cream is uniformly maintain by varying the rotational speed of the dasher varies for each ice cream generation period to simultaneously secure the ice quality and shape consistency.

Further, according to another embodiment of the present invention, a drawing amount of the ice cream can be constantly controlled regardless of a drawing time of the ice cream.

MODE FOR INVENTION

Figure 1:
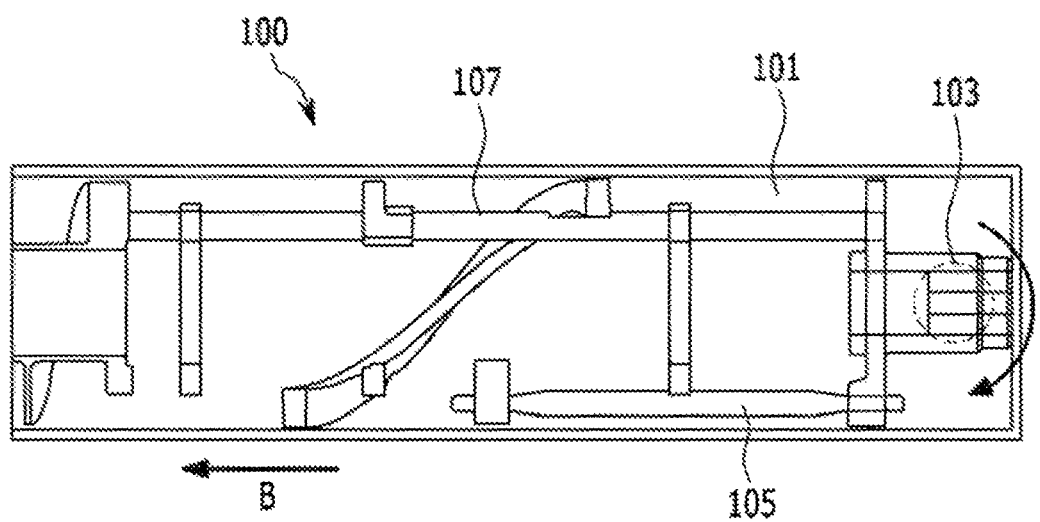
FIG. 1 which is a diagram for describing an ice cream generating process is a diagram illustrating an internal structure of a cylinder.

Hereinafter, embodiments of the present invention will be described in detail with reference to the accompanying drawings. Embodiments of the present invention are provided to more completely describe the present invention to those skilled in the art and various modifications of the embodiments described below can be made and the scope of the present invention is not limited to the embodiments described below. Still, the embodiment is provided to make the present disclosure be more substantial and complete and completely transfer the spirit of the present invention to those skilled in the art.

In the drawings, for example, modifications of illustrated shapes may be anticipated according to a manufacturing technology and/or tolerance. Therefore, the embodiments of the present invention should not be interpreted to be limited to a specific shape of an area illustrated in the preset specification and should include, for example, a change in shape, which is caused in terms of manufacturing. Like reference numerals continuously refer to like elements. Furthermore, various elements and areas in the drawings are schematically drawn. Accordingly, the present invention is not limited by a relative size or interval drawn in the accompanying drawings.

FIG. 1 which is a diagram for describing an ice cream generating process is a diagram illustrating an internal structure of a cylinder.

Referring to FIG. 1, a liquefied ice cream original liquid and air which pass through a carburetor are input through an inlet 103 in a sealed cylinder 101. The liquefied ice cream original liquid is agitated in the cylinder 101 by a dasher 107 which rotates and is thus mixed with the air, and as a result, over-run is formed. Heat is exchanged by an evaporator (not illustrated) on an inner wall of the cylinder and a phase change occurs on the inner wall of the cylinder. That is, the liquefied ice cream original liquid becomes solidified ice cream due to solidification by the heat exchange. In this case, current of a dasher motor fluctuates due to a change in load by a phase change from a liquid to a solid.

Like this, the solidified ice cream is ground by a dasher structure bunch and a blade 105 as the dasher 107 rotates. In addition, the ground ice cream is mixed with the internal original liquid by rotation of the dasher 107. While the processes up to now are repeated, in the case of the internal ice cream a solid particle, the liquid, and the air are appropriately mixed. Thereafter, when a dasher cover (not illustrated) in a drawing direction is opened, soft ice cream in a state in which the solid particle and the air are appropriately mixed is drawn to the outside.

In this case, when a rotational speed of the dasher increases, the number of times at which the dasher structure bunch and the blade 105 passes through the inner wall of the cylinder per time increases. In addition, consequently, a solidification time of the ice cream is shortened. Then, the size of an initial ice cream generation particle decreases. On the contrary, when the rotational speed decreases, the size of the ice cream generation particle increases. However, an ice cream raw material which is a mixture of respective different components at a freezing point or lower, a separation phenomenon of foreign materials is accelerated by friction (an inter-particle contact) as a rotation time of the dasher 107 is continued. Due to such a cause, controlling the rotation speed and an operation hour of the dasher 107 is a very important element in generating the ice cream and ice quality. Accordingly, an embodiment of the present invention of improving the ice quality of the ice cream by controlling the rotational speed of the dasher 107 is described.

Figure 2:
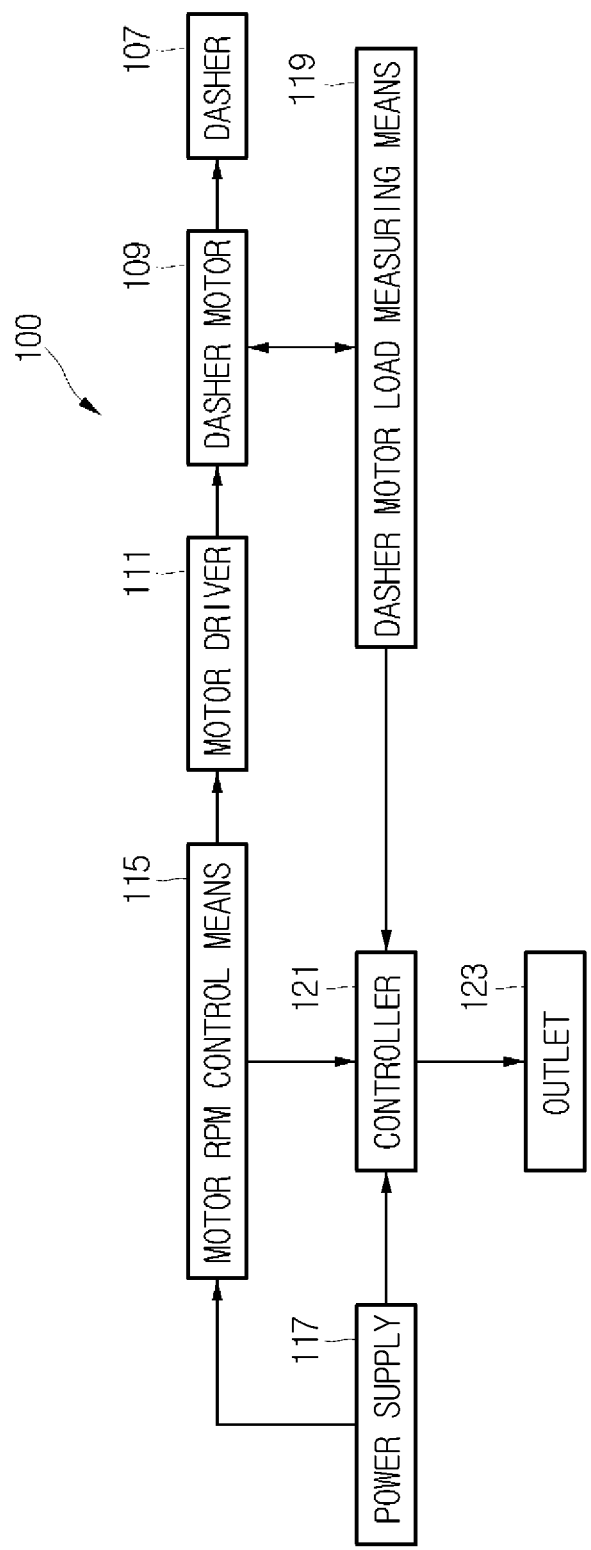
FIG. 2 is a schematic block diagram illustrating an apparatus for manufacturing ice cream according to an embodiment of the present invention.
Figure 3:
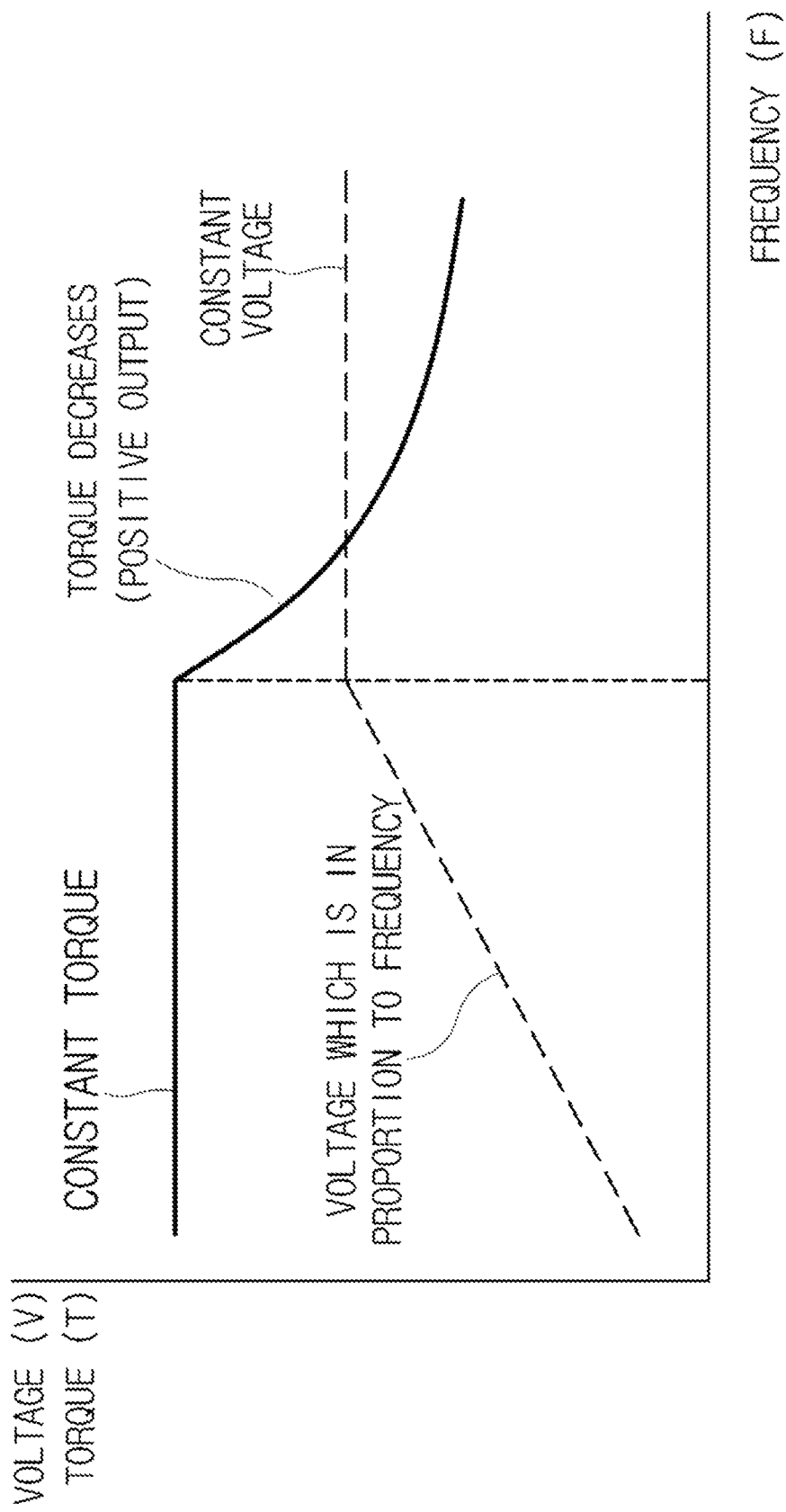
FIG. 3 is a graph showing a correlation of torque depending on a frequency a dasher motor.
Figure 4:
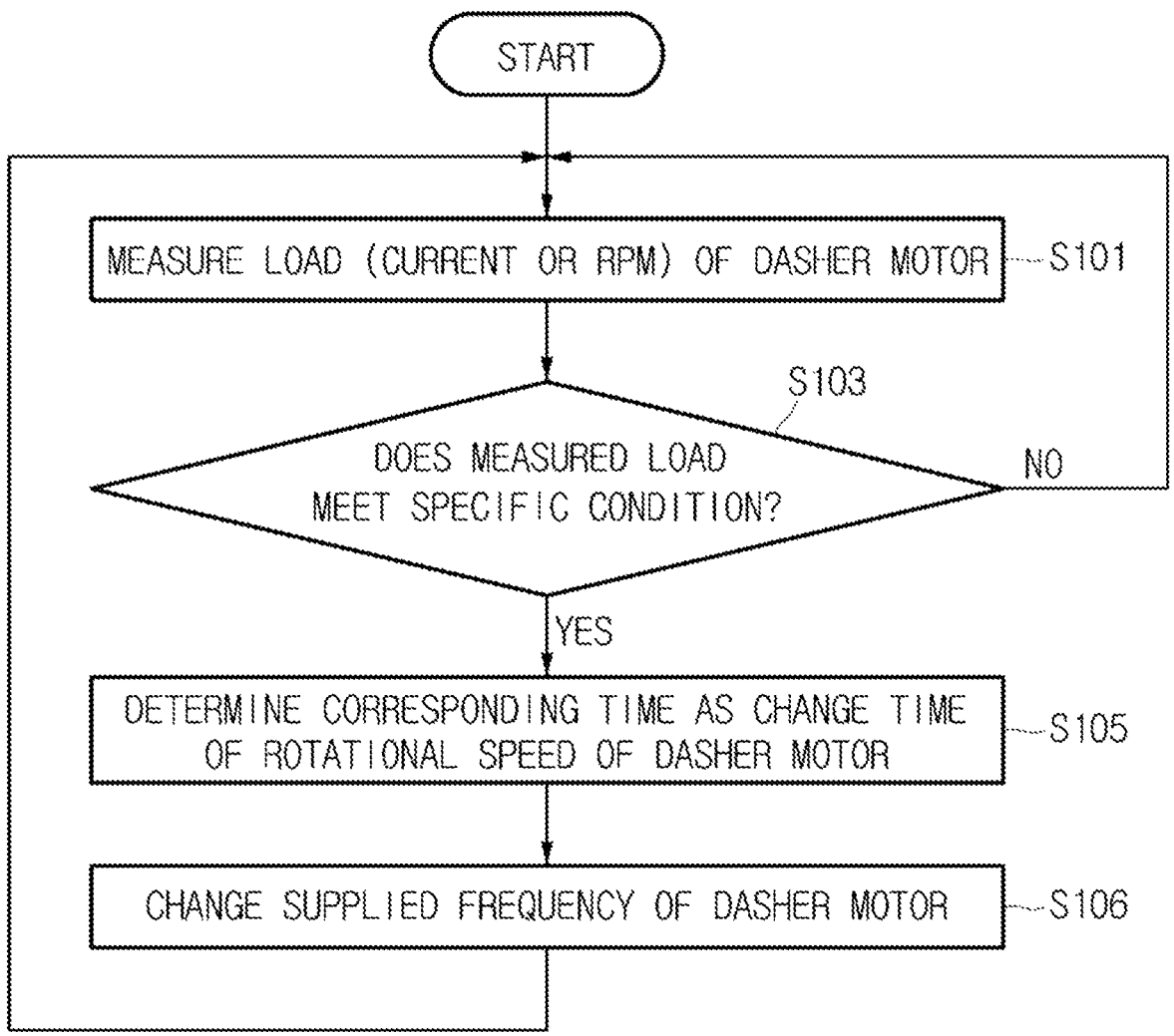
FIG. 4 is a flowchart illustrating an operation of an apparatus for manufacturing ice cream according to an embodiment of the present invention.

FIG. 2 is a schematic block diagram illustrating an apparatus for manufacturing ice cream according to an embodiment of the present invention, FIG. 3 is a graph showing a correlation of torque depending on a frequency a dasher motor, and FIG. 4 is a flowchart illustrating an operation of an apparatus for manufacturing ice cream according to an embodiment of the present invention.

Referring to FIG. 2, the apparatus 100 for manufacturing ice cream according to the embodiment of the present invention includes a dasher 107, a dasher motor 109, a motor driver 111, a motor RPM control means 115, a power supply 117, a dasher motor load measuring means 119, a controller 121, and an outlet 123. Besides, the apparatus 100 for manufacturing ice cream may include detailed components of a general ice cream manufacturing apparatus, such as an input unit (not illustrated) a voice guide unit (not illustrated), a display unit (not illustrated), a freezing unit (not illustrated), and a refrigeration unit (not illustrated), but the components may be omitted and in FIG. 2, only the component according to the embodiment of the present invention is schematically illustrated.

Herein, each component of the apparatus 100 for manufacturing ice cream will be described below. The dasher 107 as a screw shape is positioned in the cylinder 101 of FIG. 1. The dasher 107 agitates the ice cream original liquid and the air input in the sealed cylinder while rotating and thereafter, transports the generated soft ice cream to the front of the cylinder.

The dasher motor 109 rotates at a rotational speed depending on a frequency of driving power supplied from the motor RPM control means 115. In this case, when the rotational speed is low, the dasher motor 109 reduces friction of the ice cream by rotating the dasher 107 rotates the dasher 107 at a comparatively low rotational speed to maintain the ice quality of the ice cream in the cylinder in an optimal state. In addition, when the rotational speed is high, the dasher 107 is rapidly rotated at a comparatively high rotational speed to rapidly transport the ice cream in the cylinder to the front of the cylinder.

The motor driver 111 is configured by a circuit that drives the dasher motor 109 by switching the driving power output by the motor RPM control means 115. When the motor driver 111 receives driving power having a frequency of 20 to 100 Hz, the motor driver 111 rotates the dasher 107 at a low speed by rotating the dasher motor 109 at a speed of approximately 40 to 200 RPM. In addition, when the motor driver 50 receives the driving power having a frequency of 50 to 200 Hz, the motor driver 111 rotates the dasher 107 at a high speed by rotating the dasher motor 109 at a speed of approximately 100 to 400 RPM.

The motor RPM control means 115 converts the frequency of the driving power supplied from the power supply 117 into a frequency requested by the controller 121 and supplies the driving power to the motor driver 111 to control the rotational speed of the dasher motor 109 according to the frequency. For example, the motor RPM control means 115 may increase and output the frequency so that operation power having the frequency of 20 to 100 Hz, which is output from the power supply 117 becomes a high frequency of approximately 50 to 200 Hz. Further, contrary thereto, the frequency may be decreased and output.

The ice cream is drawn through the outlet 123 and the outlet 123 is opened for a time requested by the controller 121 by receiving power from the power supply 117 to allow the ice cream to be drawn.

The power supply 117 outputs the driving power having a predetermined frequency.

The dasher motor load measuring means 119 measures a load of the dasher motor 109 and converts the measured load value into a value to be recognized by the controller 121 and outputs the corresponding value to the controller 121. The dasher motor load measuring means 119 may be a dasher motor current measuring means that measures the current of the dasher motor or a dash motor RPM measuring means that measures an RPM of the dasher motor 109.

The controller 121 controls generation and drawing of the ice cream by controlling the components of the apparatus 100 for manufacturing ice cream. The controller 121 variably controls the rotational speed of the dasher motor 109 according to conditions including generation, maintenance, drawing, and the like of the ice cream by using the motor RPM control means 115. As an embodiment, in the case where the RPM of the dasher motor 109, which is measured by the dasher motor load measuring means 119 reaches a predetermined RPM or the constant RPM is changed, when the controller 121 changes the frequency of the driving power supplied to the dasher motor 109 by controlling the motor RPM control means 115 in order to maintain the ice quality of the ice cream in an optimal state, the rotational speed of the dasher motor 109 may be made to a desired speed.

Herein, torque of the dasher motor 109 is shown in Equation 1.

$$Tm = K \times \Phi \times I = K \times \left(\frac{V}{F}\right) \times I \qquad \text{[Equation 1]}$$

Where, Tm represents the torque, K represents a motor torque constant, Φ represents magnetic flux, I represents the current, F represents the frequency, and V represents voltage.

Further, a correlation of the torque depending on the frequency is shown in FIG. 3. Accordingly, when the frequency of the driving power supplied to the dasher motor 109 is changed, the rotational speed of the dasher motor 109 is changed and resistance force applied to the dasher 107 varies for each frequency. That is, required torque is changed. When the torque is substituted in Equation 1, it may be seen that the current is changed on the assumption that the state of the internal cylinder 101 does not vary for each frequency. When the frequency is changed in the same torque region, K, V, and Tm are constant and when F fluctuates, I also fluctuates. Further, even though the resistance force applied to the dasher 107 is the same, the current measured by the dasher motor 109 may be changed even by a deviation for each device or each motor.

Therefore, in the case where the current of the dasher motor 109, which is measured by the dasher motor load measuring means 119 reaches predetermined current or the constant current is changed, when the controller 121 changes the frequency of the driving power supplied to the dasher motor 109 by controlling the motor RPM control means 115 in order to maintain the ice quality of the ice cream in the optimal state, the rotational speed of the dasher motor 109 may be made to the desired speed.

Referring to FIG. 4, first, the controller 121 determines a rotational speed change time of the dasher motor 109 based on the load of the dasher motor 109 measured by the dasher motor load measuring means 119 (S101). As described above, the dasher motor load measuring means 119 may measure the current or the RPM of the dasher motor 109.

Next, it is determined whether the measured load of the dasher motor 109 meets a specific condition. In this case, the specific condition indicates, for example, whether the measured current or RPM reaches current or an RPM which is input in advance or whether the measured current or RPM is changed. That is, it is determined whether the current or RPM measured by the dasher motor 109 reaches the current or RPM input in the controller 121 in advance or whether the constant current or RPM is changed, and as a result, when the current or RPM measured by the dasher motor 109 reaches the current or RPM input in the controller 121 in advance or the constant current or RPM is changed, the controller 121 determines the time as a RPM change time of the dasher motor 109 (S105). A current conversion time may be set as delta current ΔI and an RPM conversion time may be set as a delta RPM ΔRPM.

Although not illustrated in FIG. 4, in an embodiment, when a time for which the dasher motor 109 is driven with predetermined current or a predetermined RPM passes a predetermined time, the time which passes the predetermined time may be determined as the rotational speed change time of the dasher motor 109.

In addition, when a change in rotational speed of the dasher motor 109 is determined, the rotational speed of the dasher motor 109 is controlled by changing the frequency of the dasher motor 109 (S107). The controller 121 changes a driving power frequency of the motor driver 111 by outputting a predetermined frequency to the motor RPM control means 115 so that the frequency of the dasher motor 109 is changed to the predetermined frequency.

That is, when the load measured by the dasher motor 109 meets the specific condition while the dasher motor 109 is driven at a first frequency, the time is determined as a change time of the dasher motor 109 and the frequency of the dasher motor 109 is changed to a second frequency different from the first frequency.

Herein, in the initial ice cream generating step, since the liquefied ice cream original liquid is formed to the solidified ice cream, the frequency for the comparatively high rotational speed, for example, 50 to 120 Hz is required. In addition, in the step in which the solidified ice cream is maintained, ice cream which melts as time elapsed is generated again and shape consistency and a taste with the elapse of the time need to be maintained, and as a result, a frequency for the comparatively low rotational speed, for example, 30 to 80 Hz is required. Based on such a point, the controller 121 determines the frequency of the driving power output by the motor RPM control means 115. The controller 121 maintains the taste and the shape consistency by controlling the rotational speed of the dasher 107 according to the ice cream generating step. In spite of the change in RPM depending on the generating step, the current or RPM of the dasher motor 109 at the control time is measured and controlled to maintain the same ice quality (state).

Figure 5:
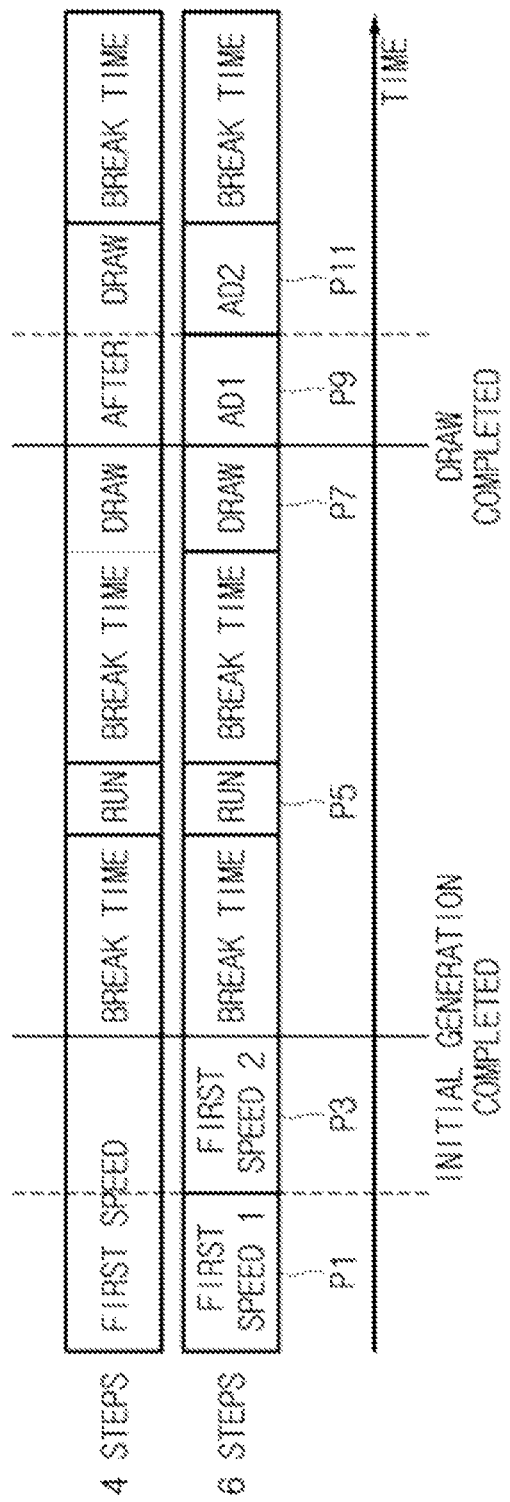
FIG. 5 is a diagram illustrating an ice cream generating period according to an embodiment of the present invention.
Figure 6:
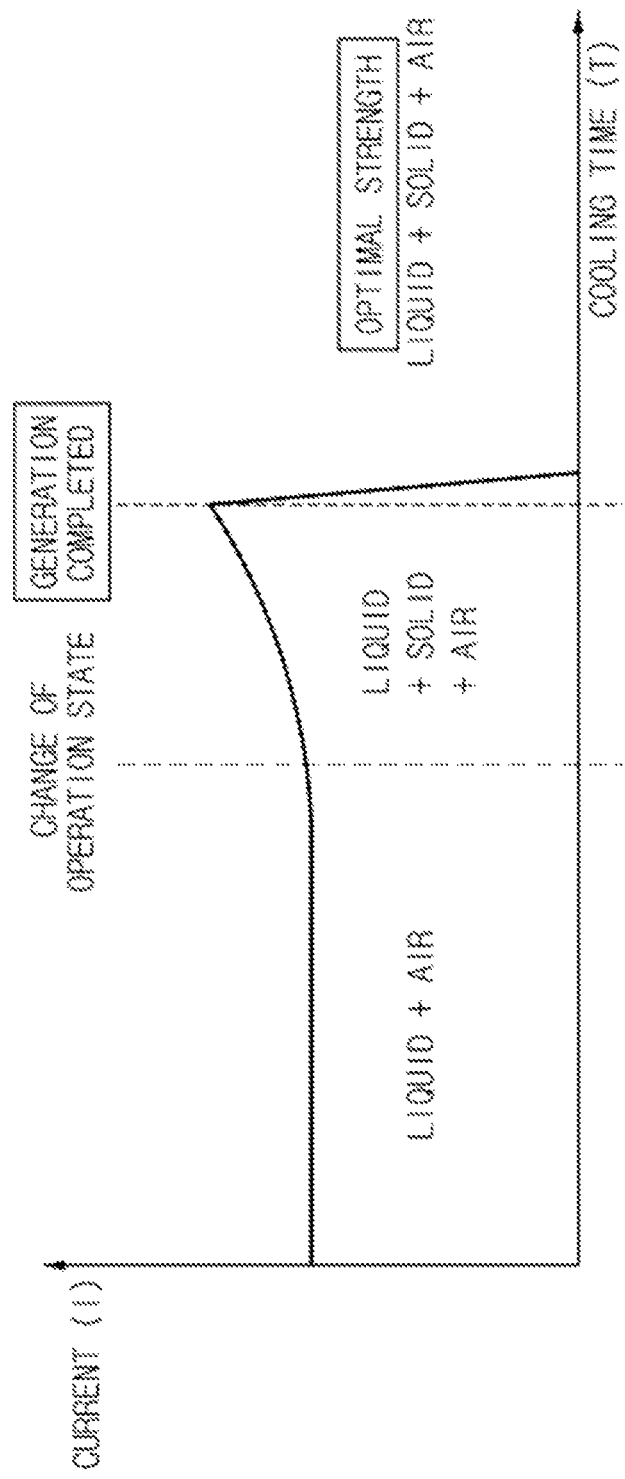
FIG. 6 is a graph showing current measured in a dasher motor at the time of generating ice cream.

FIG. 5 is a diagram illustrating an ice cream generating period according to an embodiment of the present invention and FIG. 6 is a graph showing current measured in a dasher motor at the time of generating ice cream.

Referring to FIG. 5, a change in behavior depending on the generation of the ice cream is significantly divided into 4 steps and is shown in Table 1 given below.

TABLE 1

| Step name | Description |
|---|---|
| First generation step | Liquefied original liquid is generated to solidified ice cream containing air |
| Run step | Ice cream made in cylinder is maintained and some melted ice cream is regenerated |
| Draw step | Internal pressure of predetermined value or more is generated in ice cream made in cylinder to draw ice cream |
| Step after draw | Liquefied original liquid and solidified ice cream are approximately mixed and regenerated |

According to Table 1, in the first generation step, the liquefied original liquid is generated to the solidified ice cream. In this case, an ice cream generation behavior is shown in such a manner that while the solid particle made and grounded in the inner wall of the cylinder 101 is mixed with an internal liquid, the mixture is mixed with solid particle ground later to generate the ice cream. If the rotational speed is low, bubbles and the air input in the ice cream is reduced and over-run and smoothness are reduced and ice cream having a comparatively large size of the solid particle is formed due to heat transfer reduction. When the size of the particle increases to a predetermined size or more, the taste of the ice cream becomes a tough taste such as sherbet, and as a result, the particle needs to be controlled to a predetermined size or less. Further, it is important to generate the ice cream with friction (an inter-particle contact) and cooling air at appropriate levels. When the apparatus 100 is actuated for a long time while the rotational speed is high, the friction is generated more than needs, and as a result, components of the ice cream mixture is separated by a physical property and the ice cream particle is up-sized and the ice cream becomes thin. Therefore, in the first generation step, a high-speed operation is first required.

Next, in the maintenance step (Run), the ice cream made in the cylinder is maintained and some melted ice cream is regenerated. In this case, in the ice cream generation behavior, while some melted ice cream is solidified on an outer wall and filled up, the solidified ice cream mixed with ice cream which remains in the cylinder. When the rotational speed is high, particles of the ice cream which is filled up are made to be fine, but grinding and fraction of the ice cream which already exists in the cylinder are also accelerated. When the friction (the inter-particle contact) increases at a freezing point or lower, the same material is coupled and foreign materials are separated and the particles are larger and roughened by the physical property, and a churning phenomenon occurs. Therefore, the comparatively low rotational speed (40 to 200 rpm) is required.

Next, in the draw step, the internal pressure of a predetermined value or more is generated in the cylinder to draw the ice cream to the outside. When the dasher 107 rotates at a predetermined speed or more, the internal pressure is generated and in this case, when the outlet 123 of the dasher cover 123 is opened, the internal ice cream is drawn and an original liquid and the air are filled up as large as the drawn amount. In this case, when the rotational speed of the dasher 107 is low, a pressure at an inlet of the cylinder decreases and a drawing speed of the ice cream decreases. Therefore, since a speed to provide a predetermined pressure or higher needs to be guaranteed, a relatively high rotational speed (100 to 400 rpm) is required.

Next, in the after drawn step, the liquefied original liquid and the solidified ice cream are approximately mixed and regenerated. The original liquid as large as the drawn amount and the ice cream which remains are approximately mixed and regenerated. In this case, the original liquid as large as the drawn ice cream amount and the air are newly introduced and mixed with some residual ice cream to be regenerated. Since the after draw step shows an intermediate property between the first generation and the maintenance (run), a lot of air is injected into the liquefied original liquid through comparatively high-speed rotation to increase over-run and the sizes of the ice cream particles need to be adjusted so as to promote heat transmission. A higher rotational speed (100 to 400 rpm) than the maintenance (run) is required.

In addition, although not described in Table 1, as illustrated in FIG. 5, after the ice cream is generated (the first generation step) or regenerated (the maintenance (run) step and the after draw step), a keeping (break) step of keeping the generated ice cream (solidified ice cream) is performed.

However, since a required rotational speed varies even in the same step, it is just difficult to generate ice cream having the same ice quality for each step at the time of controlling the rotational speed in four steps described in Table 1. That is, there is a limit in constantly maintaining the ice quality of the ice cream by the 4-step ice cream generating method described in Table 1.

Therefore, in the 4-step ice cream generating method described in Table 1, each of the first generating step and the after step is subdivided to change the ice cream generating step to a total of 6 steps or more.

A dualized step is divided into a first step and a latter step and the first generation step (First Speed) is divided into an initial generation period (First Speed #1) and a latter generation period (First Speed #2). In addition, the after draw step of Table 1 is also divided into a first after draw period (After draw Speed #1) and a latter after draw period (After draw Speed #2).

In this case, the initial generation period (First Speed #1) and the first after draw period (After draw Speed #1) as high-speed operation steps are steps in which minimization of particle sizes and enhancement of the ice quality and the taste are primarily considered due to granting of the over-run and an increase in heat transmission. In addition, the latter generation period (First Speed #2) and the latter after draw period (After draw Speed #2) as low-speed operation steps are steps in which the ice cream separation phenomenon needs to be minimized by maintaining constant ice cream by controlling the same load with respect to the ice cream in the cylinder 101 and reducing excessive friction (the inter-particle contact). In addition, in the latter generation period (First Speed #2) and the latter after draw period (After draw Speed #2), the dasher motor 109 rotates at the same or similar frequency as the maintenance (run) step of Table 1.

Therefore, the ice cream generation period according to the embodiment of the present invention is constituted by a total of 6-step generation periods of a first generation period P1 which is the initial generation period (First Speed #1), a second generation period P3 which is the latter generation period (First Speed #2), a third generation period P5 which is the maintenance step of Table 1, a fourth generation period P7 which is the draw step of Table 1, a fifth generation period P9 which is the first after draw step (After draw Speed #1), and a sixth generation period P11 which is the after draw step (After draw Speed #2). In addition, the keeping step (break time) is positioned between the second generation period P3 and the third generation period P5, between the third generation period P5 and the fourth generation period P7, and after the sixth generation period P11.

Herein, a high-speed rotation period of the dasher motor 109 includes the first generation period P1, the fourth generation period P7, and the fifth generation period P9. In addition, a low-speed rotation period of the dasher motor 109 includes the second generation period P3, the third generation period P5, and the sixth generation period P11. In this case, the controller 121 performs a control to generate the ice cream at the high speed during the first generation period P1 and thereafter, generate the ice cream at a comparatively low rotational speed, for example, the rotational speed of the maintenance (run) step P5 during the second generation period P3. Similarly, the controller 121 performs a control to generate the ice cream at the high speed during the fifth generation period P9 and thereafter, generate the ice cream at the comparatively low rotational speed, for example, the rotational speed of the maintenance (run) step P5 during the sixth generation period P11.

Like this, the controller 121 may control the second generation period P3 and the sixth generation period P11 at the same or similar rotational speed as the third generation period P5. In this case, the controller 121 may determine the control time based on the load measured by the dasher motor load measuring means 119 or based on elapsed time of the first generation period P1 and the fifth generation period P9. The dasher motor load measuring means 119 may measure the current or the RPM of the dasher motor 109. In this case, in the case where the current or RPM reaches the current or RPM which is input in advance or the constant current or RPM is changed, the controller 121 may control the rotational speed of the dasher 107 during the second generation period P3 and the sixth generation period P11 based on the case.

FIG. 6 is a graph showing current measured in a dasher motor at the time of generating ice cream.

Referring to FIG. 6, at the time when the liquefied ice cream original liquid and the air are mixed with each other, that is, the first generation period P1, the current is constant and when the ice cream original liquid begins to be phase-changed from the liquid to the solid, the current is changed. That is, when the load applied to the dasher motor 109 fluctuates due to the phase change, the load may be sensed by a current change $\Delta I$. Therefore, the time P when the current change $\Delta I$ is sensed, a time when the current reaches a specific value, or a time when a predetermined elapsed time $\Delta t$ elapsed is determined as a time when an operation state of the dasher motor 109, that is, the frequency is changed.

During the first generation period P1, since only the liquefied ice cream original liquid and the air exist, the measured current is constant. When the controller 121 senses that the current is changed ($\Delta I$) while monitoring the current and that the time when the current reaches a specific value or the predetermined elapsed time $\Delta t$ elapsed, the controller 121 determines the time as the time when the second generation period P3 starts to change the frequency of the power supplied to the dasher motor 109 as the frequency of the third generation period P5. Further, when the controller 121 senses that the current measured during the fifth generation period P9 is constant and thereafter, is changed ($\Delta I$) after the ice cream is drawn, the current reaches the specific value, or the predetermined elapsed time $\Delta t$ elapsed, the controller 121 determines the time as the time when the sixth generation period P11 starts to change the frequency of the power supplied to the dasher motor 109 to the frequency of the third generation period P5 or a similar frequency.

In FIG. 6, only the current measured by the dasher motor 109 at the time of generating the ice cream is illustrated and described, but even the RPM measured by the dasher motor 109 is similar. That is, at the time when the liquefied ice cream original liquid and the air are mixed with each other, that is, when the RPM is constant and thereafter, the ice cream original liquid begins to be phase-changed from the liquid to the solid, the RPM is changed and the time when the RPM reaches a specific value or the time when the second generation period P3 and the sixth generation period P11 start through a change ($\Delta RPM$) of the RPM may be determined and in this case, the controller 121 may change of the power supplied to the dasher motor 109 to the frequency of the third generation period P5 or the similar frequency thereto.

Like this, the controller 121 may find the time when the ice cream is generated from the current or RPM measured by the dasher motor load measuring means 110. Therefore, the controller 121 controls the dasher motor 109 at a low-speed state by changing the rotational speed from the high speed to the low speed through recognizing a rotational speed change time of the dasher 107 based on the found ice cream generation time to continuously maintain uniform strength and ice quality of the ice cream.

Figure 7:
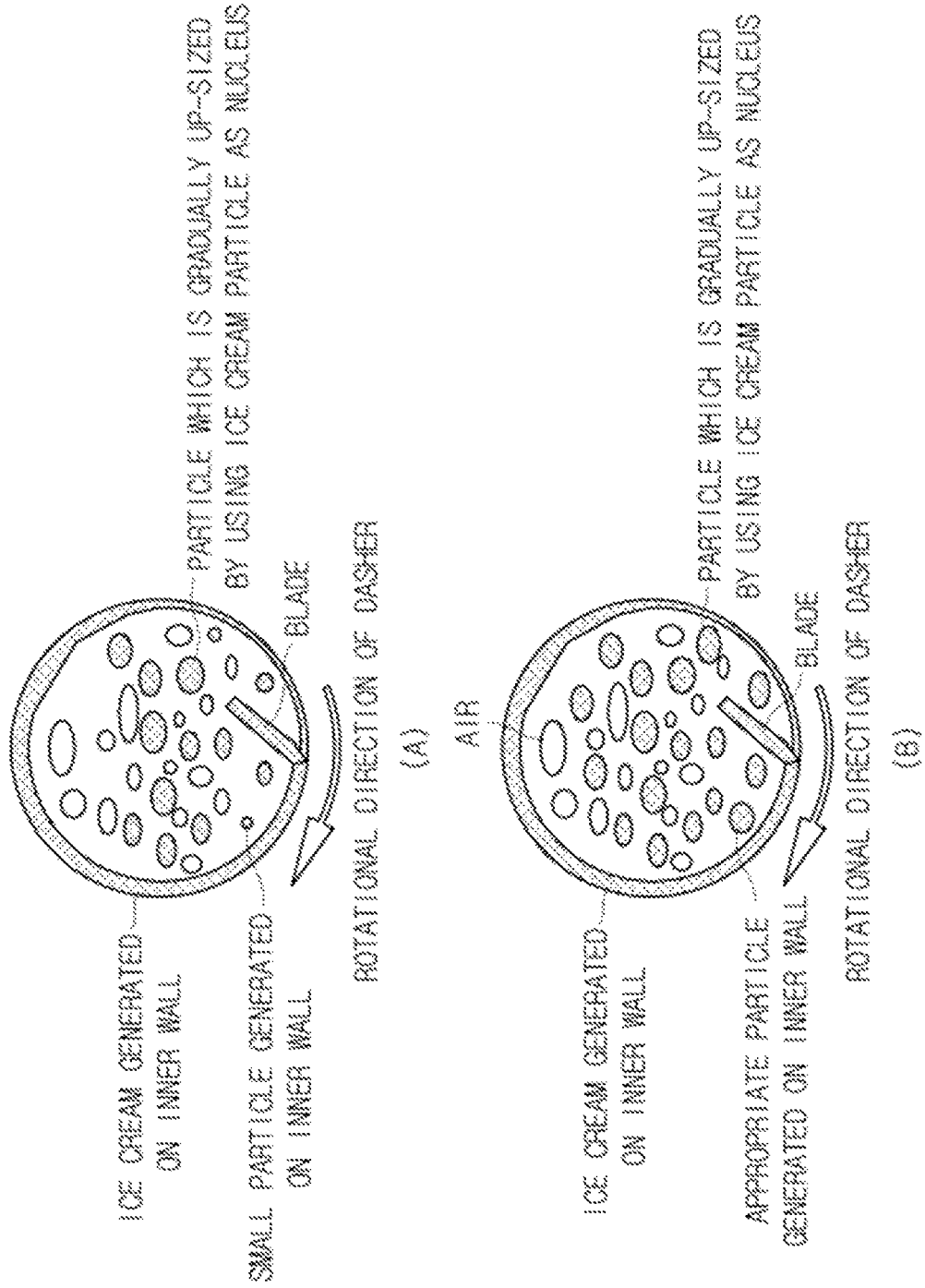
FIG. 7 is a diagram illustrating a behavior of an ice cream particle at the time of generating the ice cream.

FIG. 7 which is a diagram illustrating a behavior of an ice cream particle at the time of generating the ice cream is a diagram for describing an effect according to an embodiment of the present invention.

In this case, FIG. 7(a) illustrates the behavior of the ice cream particle depending on an internal phase change in the first generation step in the related art. FIG. 7(b) illustrates the behavior of the ice cream particle depending on the internal phase change in the first generation step according to the embodiment of the present invention.

FIG. 7(a) as the method in the related art illustrates a case where the ice cream is generated through only high-speed rotation in the first generation step and the draw step and when the ice cream is generated as such, the ice cream over-run and the particle vary after control for each step, and as a result, the taste, the ice quality, and the draw amount per time of the ice cream are continuously changed. Accordingly, the size of the ice cream is not uniform. Further, since the rotational speed change time of the dasher motor 109 is not based on the load measured by the dasher motor 109, the time of changing the rotational speed of the dasher motor 109 depending on the phase change may not accurately found, and as a result, the ice quality of the ice cream may not be constantly maintained.

On the contrary, when the ice cream is generated at the high speed in each of the first generation step and the after draw step and thereafter, the ice cream is generated at a maintenance (run) speed which is a comparatively low speed by changing the rotational speed at the time (phase change time) of changing the rotational speed of the dasher motor 109, comparatively small particles generated in the first generation period (P1 of FIG. 5) and the fifth generation period (P9 of FIG. 5) are mixed with the internal original liquid to form a partial nucleus, but a growth in size of the particle is minimized due to a decrease in number of friction times and the particles are ground at the comparatively low speed and particles which are generated late form the ice cream while maintaining an appropriate size in each of the second generation period (P3 of FIG. 5) and the sixth generation period (P11 of FIG. 5) to secure the taste and the shape consistency, as illustrated in FIG. 7(*b*). That is, the size of the ice cream particle is uniformalized.

As described above, in the 6-step ice cream generating step control according to the embodiment of the present invention, the frequency is different, but the control time is the same to decrease a deviation of the ice quality (strength) for each step by measuring the same load and a comparatively uniform particle size is maintained by controlling the generation of the ice cream at the comparatively low speed at a latter completion time after first high-speed generation of the ice cream, and as a result, the shape consistency is enhanced.

The ice cream generation step is described with 6 steps as above, but the ice cream generation step is not limited to 6 steps and only the first generation step is dualized to be changed to 5 steps or only the after draw step is dualized to be changed to 5 steps. Further, in another embodiment, the first the generation step or the after draw step are further subdivided to be changed to 6 steps or more.

In addition, the controller 121 may control the draw amount with which the generated ice cream is drawn to the outside by controlling an opening time of the outlet 123.

Figure 8:
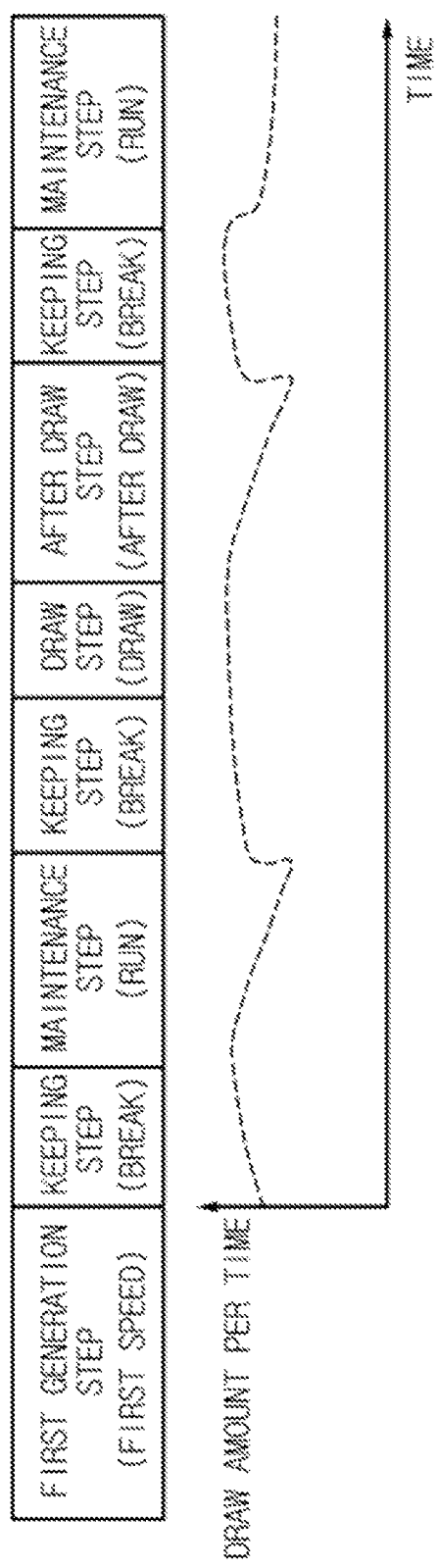
FIG. 8 is a diagram illustrating a change in drawing amount of ice cream per time for each generation step of the ice cream.

When the ice cream is sold, the ice cream is generally sold while being contained in a predetermined container and in this case, a predetermined amount of ice cream needs to be drawn. However, the ice quality (strength) of the ice cream varies according to the generation step of the ice cream, and as a result, the amount of ice cream drawn per time is not constant. FIG. 8 illustrates a change in draw amount of ice cream per time for each generation step of the ice cream.

As illustrated in FIG. 8, the draw amount of the ice cream per time is large just after the first generation step of the ice cream. In addition, in the ice cream keeping step (break), as a keeping time increases, the draw amount of the ice cream per time increases. That is, just before the ice cream enters the maintenance step (run), the draw amount of the ice cream per time is largest. However, after the ice cream draw step, the draw amount of the ice cream per time is smallest and even in the ice cream maintenance step (run), the draw amount of the ice cream per time is small.

Just after the first generation step of the ice cream, the draw amount of the ice cream per time is large while soft ice cream composed of the solid, the liquid, and gas is fully filled in the cylinder 107. In addition, in the ice cream keeping step, the ice cream is melted on the inner wall of the cylinder and the inner wall of the dasher cover, and as a result, a ratio of the liquid increases on a wall surface. Therefore, friction force is reduced, and as a result, the draw amount of the ice cream per time is largest.

Contrary to this, after the ice cream draw step, while the ratio of the liquid increases by the original liquid which is newly input in proportion to the draw amount of the ice cream, the ratio of the liquid in the cylinder 107 is high and the draw amount of the ice cream per time is small. Similarly even in the ice cream maintenance step, the ratio of the liquid in the cylinder is high, and as a result, the draw amount of the ice cream per time decreases.

Since a change in volume of the original liquid at the time of generating the ice cream is not observed, it can be seen that a change in density of the internal ice cream is not large. Consequently, it is shown that the draw amount of the ice cream per time is changed by a change in ratio of the solid and the liquid in the ice cream and this case may show that the draw amount of the ice cream per time is changed according to the viscosity of the ice cream.

Propulsion of the ice cream is generated by rotation of the dasher bunch and is in proportion to the RPM of the dasher. Surface force (friction force) is generated on the inner wall of the cylinder or the inner wall of the dasher cover, that is, an interface between a flow path and a fluid and is in proportion to the viscosity. Volumetric force of the ice cream is generated in the ice cream and when characteristics (when the ice cream is drawn, a fluid behavior and when the ice cream is drawn, the shape consistence is maintained), it is reasonable that the ice cream is analyzed by a shear stress model of an ideal plastic fluid among non-Newton fluids in which the shear stress and deformation rate are not in direct proportion to each other. This is shown in Equation 2.

$$\tau_{yx} = \tau_y + k\left|\frac{du}{dy}\right|^{n-1}\frac{du}{dy} = \tau_y + \eta\frac{du}{dy} \qquad \text{[Equation 2]}$$

Where, $\tau_{yx}$ represents shear stress, $\tau_y$ represents minimum yield stress, $\eta$ represent apparent viscosity, and du/dy as a speed slope represents the draw amount (deformation rate) of the ice cream per time.

Figure 9:
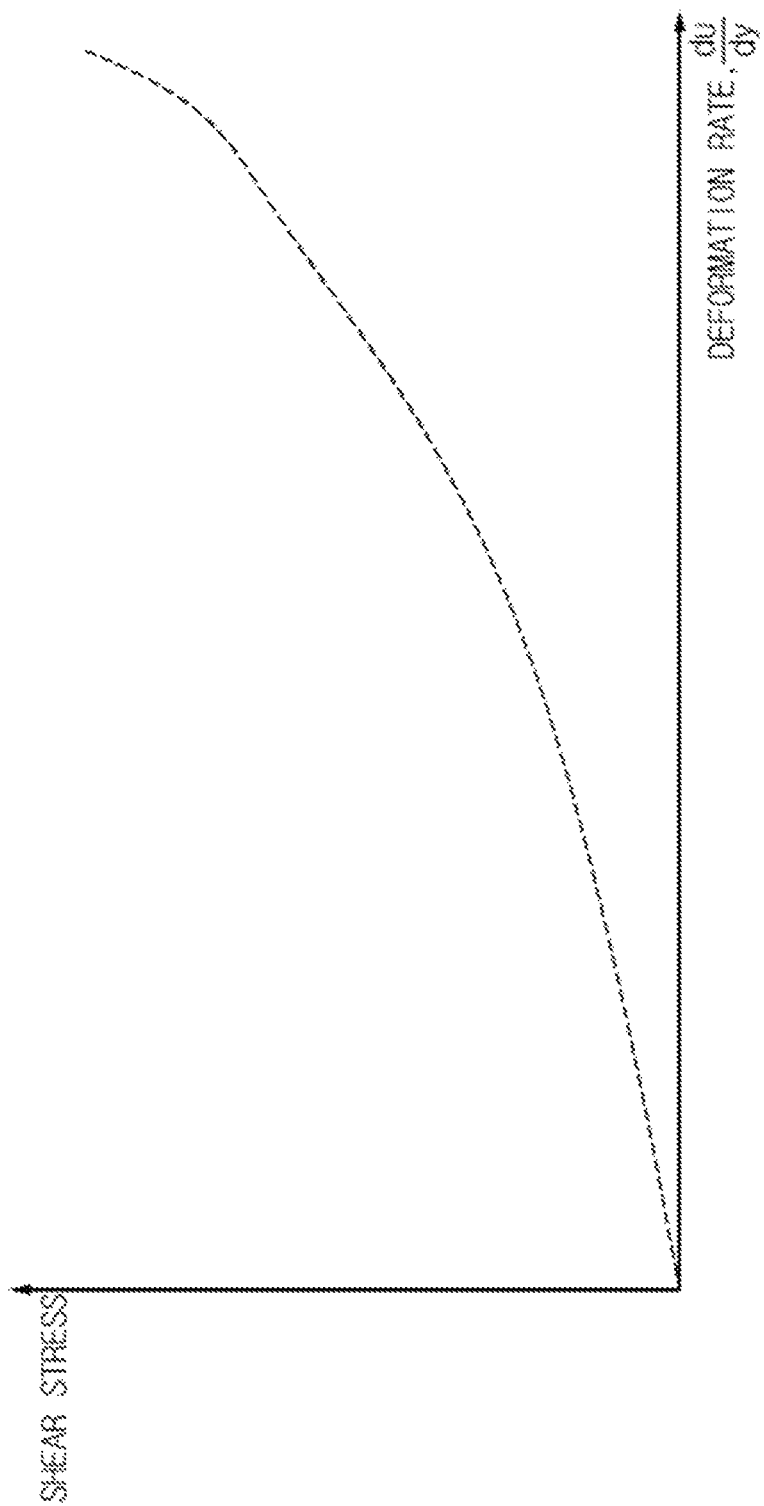
FIG. 9 is a graph showing a relationship between shear stress $\tau$ and deformation rate du/dy of the ice cream.
Figure 10:
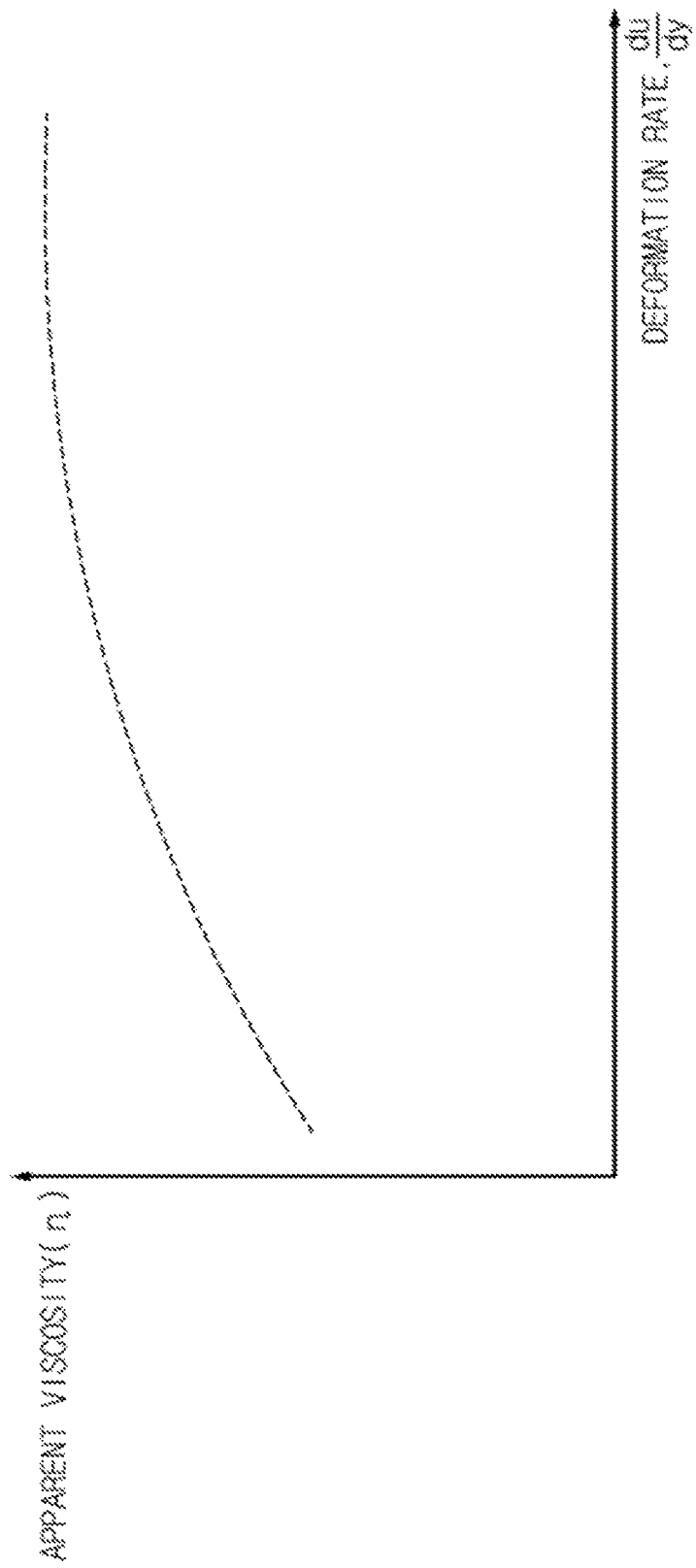
FIG. 10 is a graph showing a relationship between apparent viscosity $\eta$ and deformation rate du/dy of the ice cream.

A relationship between the shear stress $\tau$ and the deformation rate du/dy is shown in FIG. 9 and the relationship between the apparent viscosity $\eta$ and the deformation rate du/dy is shown in FIG. 10. As illustrated in FIGS. 9 and 10, when the shear stress increases or the apparent viscosity increases, the deformation rate increases. The following face may be known based on such a situation. When resistance is large at the time of drawing the ice cream, it can be seen that the shear stress increases and this may represent that the viscosity increases. In addition, as a result, it can be seen that the draw amount of the ice cream per time will increase. Contrary to this, when the resistance is small at the time of drawing the ice cream, it can be seen that the shear stress decreases and this may represent that the viscosity decreases. In addition, as a result, it can be seen that the draw amount of the ice cream per time will decrease. In addition, it can be seen that when the keeping time of the ice cream is lengthened, the friction force decreases, and as a result, the draw amount of the ice cream per time will increases.

In summary, when force (that is, stress) required for drawing the ice cream increases, the deformation rate increases and the draw amount of the ice cream per time thus increases and when the keeping time of the ice cream is lengthened, the frication force decreases and the draw amount of the ice cream per time thus increases under the same stress.

The dasher 107 is rotated by using the dasher motor 109 and the torque of the motor 109 is shown in Equation 1.

As shown in Equation 1, when current I of the dasher motor 109 increases or the RPM of dasher motor 109 decreases, the force required for drawing the ice cream increases. That is, when the current measured in the dasher motor 109 before the ice cream is drawn is high or the RPM is low, the draw amount of the ice cream per time increases. On the contrary, when the current measured in the dasher motor 109 before the ice cream is drawn is low or the RPM is high, the draw amount of the ice cream per time decreases.

When an embodiment 100 of the apparatus for manufacturing the ice cream according to the present invention, which may draw a constant amount when drawing the ice cream is described together with FIG. 2, the embodiment 100 of the apparatus for manufacturing the ice cream according to the present invention includes the dasher 107, the dasher motor 109, the dasher motor load measuring means 119, an ice cream keeping time measuring means (not illustrated), and the controller 121.

The dasher 107 is positioned in the cylinder 101 as described above and the liquefied ice cream original liquid and the air which are input into the sealed cylinder 107 are agitated.

The dasher motor 109 also rotates the dasher 107 as described above.

As described above, the dasher motor load measuring means 119 which also measures the load of the dasher motor 109 may measure the current or RPM of the dasher motor 109.

The ice cream keeping time measuring means (not illustrated) measures an elapsed time of the ice cream keeping step (break).

The controller 121 controls a draw time of the ice cream based on the load of the dasher motor 109, which is measured by the dasher motor load measuring means 119. The draw time of the ice cream may be controlled by controlling the opening time of the outlet 123. To this end, reference current or a reference RPM at which a constant amount of ice cream is drawn is set in the controller 121 in advance. One reference current or reference RPM may be set and one or more reference current or reference RPMs may be set.

When the current is high or the RPM is low, which is measured by the dasher motor load measuring means 119, the draw amount of the ice cream per time increases. On the contrary, when the current is low or the RPM is high, which is measured by the dasher motor load measuring means 119, the draw amount of the ice cream per time decreases.

Accordingly, when the current measured by the dasher motor load measuring means 119 is higher than the reference current, the controller 121 controls the draw time of the ice cream to decrease. For example, when the current measured by the dasher motor load measuring means 119 is high, the controller 121 controls the opening time of the outlet 123 to decrease to draw the constant amount of ice cream. On the contrary, when the current measured by the dasher motor load measuring means 119 is lower than the reference current, the controller 121 lengthens the opening time of the outlet 123 to control the draw time of the ice cream to increase.

Similarly, when the RPM measured by the dasher motor load measuring means 119 is lower than the reference RPM, the controller 121 controls the draw time of the ice cream to decrease. For example, when the RPM measured by the dasher motor load measuring means 119 is low, the controller 121 controls the opening time of the outlet 123 to decrease to draw the constant amount of ice cream. On the contrary, when the RPM measured by the dasher motor load measuring means 119 is lower than the RPM, the controller 121 lengthens the opening time of the outlet 123 to control the draw time of the ice cream to increase.

The controller 121 may control the draw time of the ice cream based on the elapsed time in the ice cream keeping step, which is measured by the ice cream keeping time measuring means. To this end, a reference keeping time of the ice cream is set in the controller 121 in advance. One reference keeping time may be set and multiple reference keeping time may be set.

As described above, when the keeping time of the ice cream is lengthened, the ice cream is melted on the inner wall of the cylinder and the inner wall of the dasher and the friction force thus decreases, and as a result, the draw amount of the ice cream per time increases. Therefore, when the ice cream keeping time of the ice cream, which is measured by the ice cream keeping time measuring means reaches the reference keeping time, the controller 121 shortens the opening time of the outlet 123 to control the draw time of the ice cream to decrease.

Figure 11:
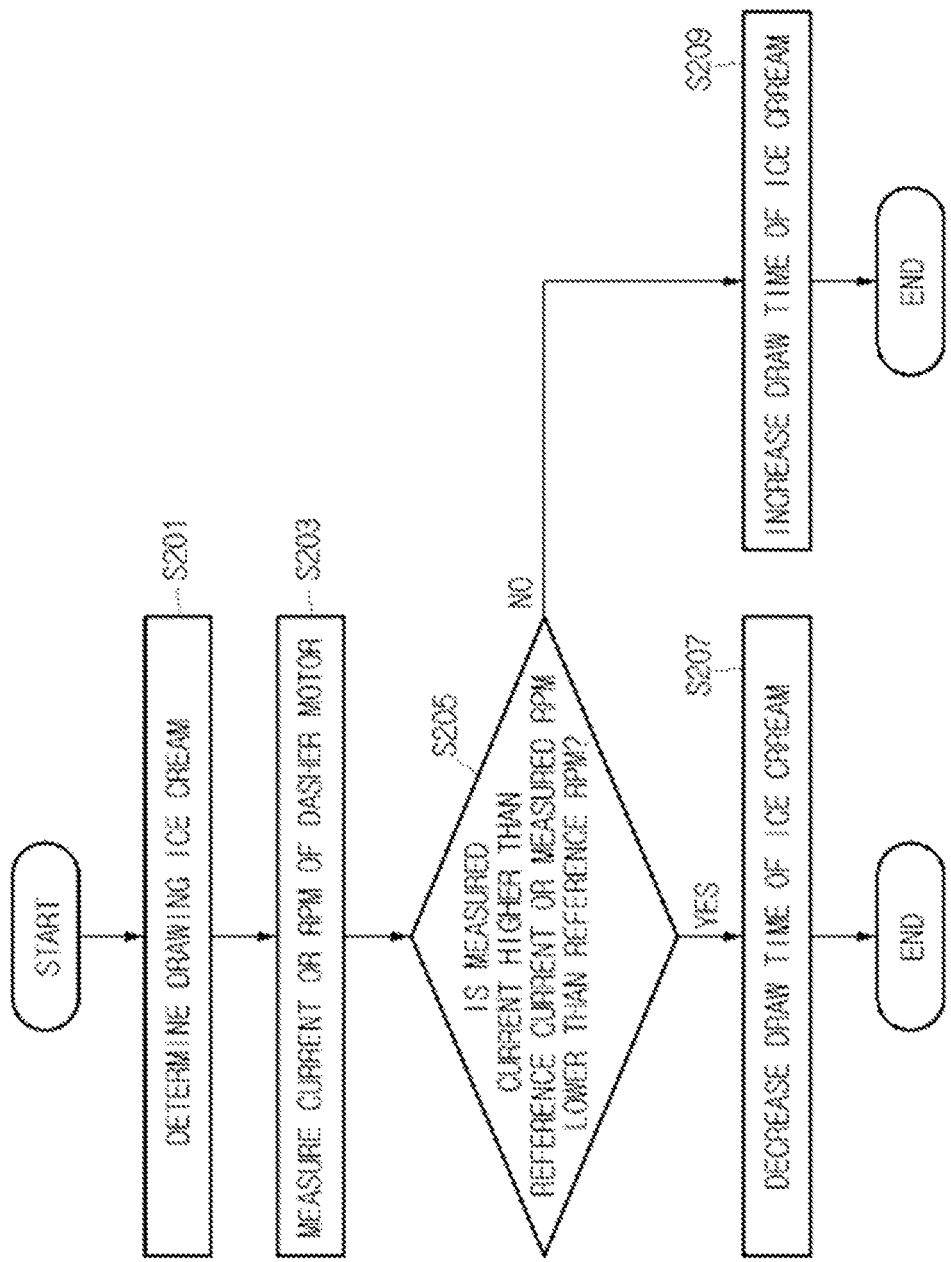
FIG. 11 is a flowchart illustrating a method for drawing ice cream according to an embodiment of the present invention.

FIG. 11 is a flowchart illustrating a method for drawing ice cream according to an embodiment of the present invention.

As described above, the ice cream is generated through the first generation step (First speed) in which the liquefied original ice cream liquid is generated to the solid ice cream. In addition, the ice cream is kept and maintained by repeating the keeping step (Break) of keeping the solidified ice cream and the maintenance step (run) in which the solidified ice cream is mixed with some ice cream which is melted in the cylinder and the ice cream is thus regenerated. The ice cream is drawn while the ice cream is kept and maintained. In addition, after the ice cream is drawn, the original liquid of the ice cream as large as the amount of the drawn ice cream is newly input and the ice cream which remains after draw and the newly input original ice cream liquid, and the air are mixed, and as a result, the ice cream is regenerated. The step of regenerating the ice cream after drawing the ice cream is the after draw step as described above and when the after draw step is completed, the keeping step and the maintenance step are repeated again. The ice cream may be drawn to the outside even in the after draw step in addition to the keeping step and the maintenance step.

Referring to FIG. 11, when the drawing of the ice cream is determined while the ice cream is kept and the maintained (S201), the current or RPM of the dasher motor 109 is measured (S203). In addition, the measured current or RPM is compared with the reference current or reference RPM (S205). As a comparison result, when the measure current is higher than the reference current or the measured RPM is lower than the reference RPM, the draw amount of the ice cream per time is large, and as a result, the draw time of the ice cream decreases to draw the constant amount of ice cream (S207). On the contrary, when the measure current is lower than the reference current or the measured RPM is higher than the reference RPM, the draw amount of the ice cream per time is small, and as a result, the draw time of the ice cream increases to draw the constant amount of ice cream (S209).

In addition, although not illustrated in FIG. 11, when the elapsed time of the ice cream keeping step reaches the reference keeping time, the draw amount of the ice cream per time increases, and as a result, the draw time of the ice cream decreases to draw the constant amount of ice cream. This may be performed separately from steps S207 and S209 or together when steps S207 and S209 are performed. For example, when the current measured in the dasher motor 109 is higher than the reference current and the ice cream keeping time reaches the reference keeping time, the draw time of the ice cream further decreases to draw the constant amount of ice cream in performing step S207. Similarly, when the RPM measured in the dasher motor 109 is higher than the reference RPM and the ice cream keeping time is much smaller than the reference keeping time, the draw time of the ice cream further increases to draw the constant amount of ice cream in performing step S209.

As described above, when the draw time of the ice cream is controlled based on the load (current or RPM) measured in the dasher motor 109 and the keeping time of the ice cream, the draw amount of the ice cream may be constantly controlled.

While the embodiments of the present invention have been illustrated and described above, the present invention is not limited to the aforementioned specific exemplary embodiments, various modifications may be made by a person with ordinary skill in the technical field to which the present invention pertains without departing from the subject matters of the present invention that are claimed in the claims, and these modifications are included in the disclosed scope of the claims.

The invention claimed is:

1. A method for manufacturing ice cream by using an apparatus for manufacturing ice cream, which includes a dasher positioned in a cylinder and agitating a liquefied original ice cream liquid and air, and a dasher motor rotating the dasher, the method comprising:
   generating solid ice cream from a liquid original ice cream liquid;
   mixing the solidified ice cream with some melted ice cream in the cylinder to regenerate the ice cream;
   drawing the manufactured ice cream to the outside; and
   mixing ice cream which remains after the draw, an original ice cream liquid, and the air to regenerate the ice cream,
   wherein a rotational speed of the dasher motor in the mixing the solidified ice cream with some melted ice cream in the cylinder is not higher than the rotational speeds in the generating solid ice cream from a liquid original ice cream liquid, the drawing the manufactured ice cream to the outside, and the mixing ice cream which remains after the draw, an original ice cream liquid, and the air.

2. The method for manufacturing ice cream of claim 1, wherein at least one characteristic is provided between
   (a) a characteristic in which the generating solid ice cream from a liquid original ice cream liquid includes
      an initial generation period in which the original ice cream liquid and the air are agitated, and
      a latter generation period in which the original ice cream liquid is solidified,
      the rotational speed of the dasher motor during the latter generation period is lower than the rotational speed of the dasher motor during the initial generation period, and
   (b) a characteristic in which the mixing ice cream which remains after the draw, an original ice cream liquid, and the air includes
      an initial after draw period in which the ice cream which remains after the draw, the original ice cream liquid, and the air are mixed with each other, and
      a latter after draw period in which the remaining ice cream and the original ice cream liquid are solidified, and the rotational speed of the dasher motor during the latter after draw period is lower than the rotational speed of the dasher motor during the initial after draw period.

3. The method for manufacturing ice cream of claim 2, wherein the rotational speeds during the latter generation period and the latter after draw period are similar to the rotational speed of the dasher motor in the mixing the solidified ice cream with some melted ice cream in the cylinder.

4. The method for manufacturing ice cream of claim 2, wherein the rotational speed of the dasher motor is changed based on at least one of a load measured in the dasher motor, a variation of the load measured in the dasher motor, and an elapsed time.

5. The method for manufacturing ice cream of claim 4, wherein the load measured in the dasher motor is current or an RPM measured in the dasher motor.

* * * * *